(12) United States Patent
Uchida et al.

(10) Patent No.: US 10,131,504 B2
(45) Date of Patent: Nov. 20, 2018

(54) BELT CLEANER

(71) Applicant: Nippon Tsusho Kabushiki Kaisha, Tokyo (JP)

(72) Inventors: Masahiro Uchida, Tokyo (JP); Nobuyoshi Fujisaki, Tokyo (JP)

(73) Assignee: NIPPON TSUSHO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/708,329

(22) Filed: Sep. 19, 2017

(65) Prior Publication Data

US 2018/0282077 A1   Oct. 4, 2018

(30) Foreign Application Priority Data

Apr. 4, 2017   (JP) ................................. 2017-074373

(51) Int. Cl.
| | |
|---|---|
| B65G 45/00 | (2006.01) |
| B65G 45/12 | (2006.01) |
| B65G 45/14 | (2006.01) |
| B65G 45/16 | (2006.01) |

(52) U.S. Cl.
CPC .................................... B65G 45/16 (2013.01)

(58) Field of Classification Search
None
See application file for complete search history.

(56) References Cited

U.S. PATENT DOCUMENTS

| | | | |
|---|---|---|---|
| 3,841,470 A | 10/1974 | Meguro | |
| 4,962,845 A * | 10/1990 | Gibbs | B65G 45/16 198/499 |
| 5,082,106 A | 1/1992 | Schwarze | |
| 5,975,281 A | 11/1999 | Yoshizako et al. | |
| 6,374,991 B1 * | 4/2002 | Swinderman | B65G 45/12 198/499 |
| 6,991,088 B1 * | 1/2006 | Smith | B65G 45/16 198/499 |
| 7,051,862 B1 * | 5/2006 | Smith | B65G 45/16 198/497 |
| 7,083,040 B2 * | 8/2006 | Finger | B65G 45/12 198/497 |

(Continued)

FOREIGN PATENT DOCUMENTS

| | | |
|---|---|---|
| DE | 27 09 714 A1 | 9/1978 |
| EP | 0 289 659 B1 | 8/1990 |

(Continued)

*Primary Examiner* — Kavel Singh
(74) *Attorney, Agent, or Firm* — David S. Safran; Roberts Mlotkowski Safran Cole & Calderon, P.C.

(57) ABSTRACT

A belt cleaner is provided which does not damage the belt surface during the scraping operation where tips on an arcuate scraper held in a holder are inclined and pushed against the belt surface with rotary shafts of the holder rotated by a resilient force. A scraper (20) is provided with a flat slope (29) extending in parallel with the belt surface from top edges of the tips (21) in the belt running direction (F), said flat slope (29) is made to contact with the belt surface in a manner of surface-contact connection when the tips are shifted up the posture from a vertical posture to an inclined posture, and a width (W) of said flat slope (29) in the belt running direction with respect to the thickness (t) of said tip (21) is formed under the condition of t<W.

5 Claims, 11 Drawing Sheets

(56) References Cited

U.S. PATENT DOCUMENTS 8,061,508 B2 * 11/2011 Metzner ................. B65G 45/12
198/497
2008/0093200 A1 4/2008 Mat

FOREIGN PATENT DOCUMENTS

| | | |
|---|---|---|
| EP | 0 338 118 B1 | 11/1993 |
| EP | 0 891 934 A1 | 1/1999 |
| EP | 2 226 275 B1 | 10/2012 |
| GB | 873 418 A | 7/1961 |
| JP | H 2-28411 A | 1/1990 |
| JP | 7-20766 B2 | 3/1995 |
| WO | 2009/135162 A1 | 11/2009 |
| WO | 2011/080006 A1 | 7/2011 |

* cited by examiner

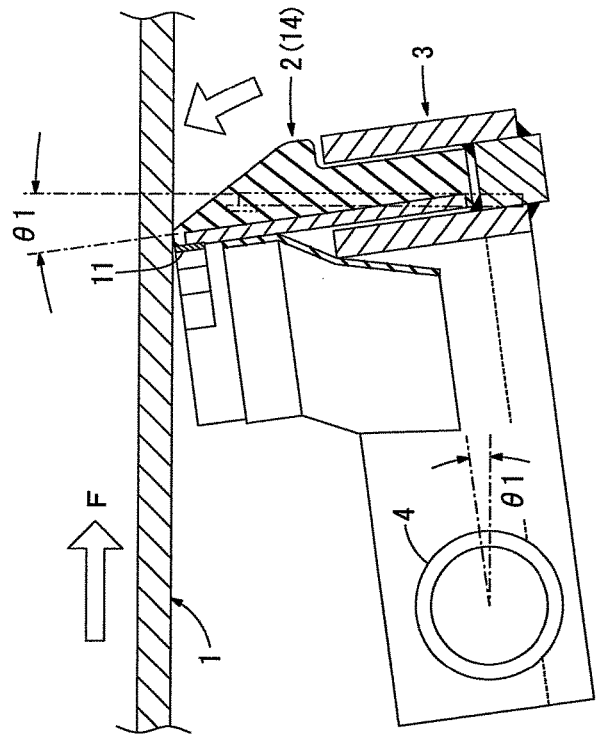
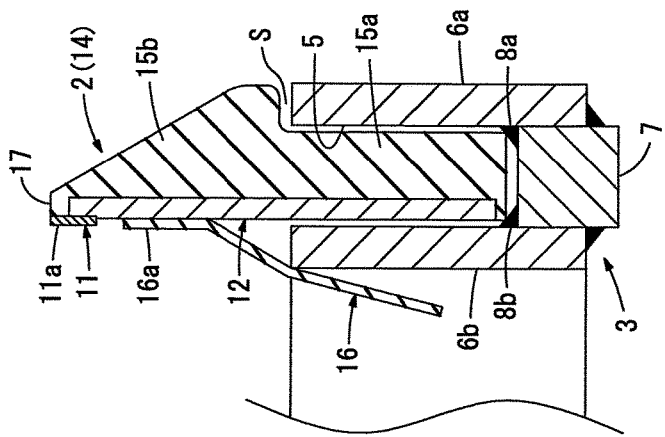
FIG. 4(A) (Prior Art)
FIG. 4(B) (Prior Art)

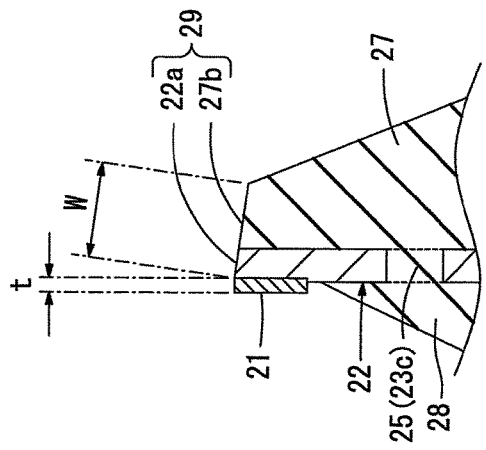
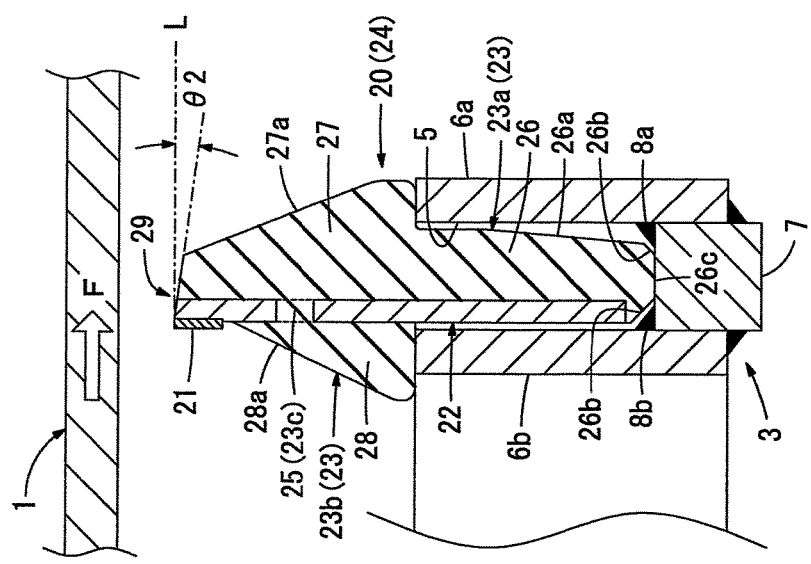
FIG. 6(A)
FIG. 6(B)

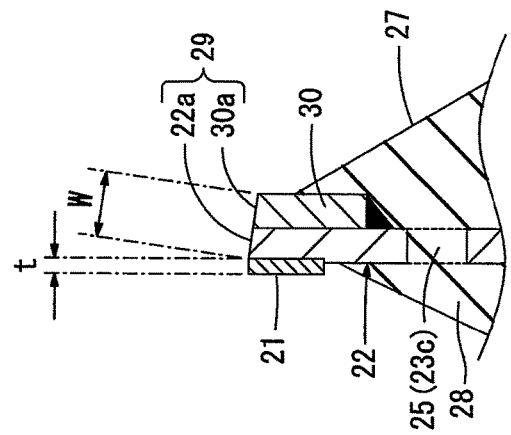
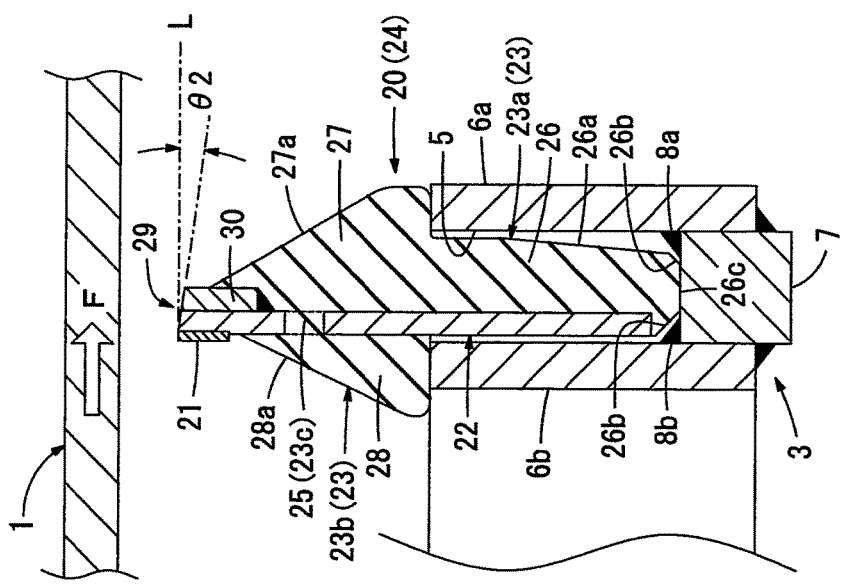
FIG. 8 (A)
FIG. 8 (B)

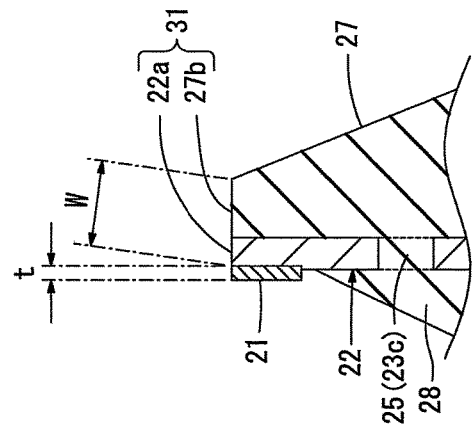
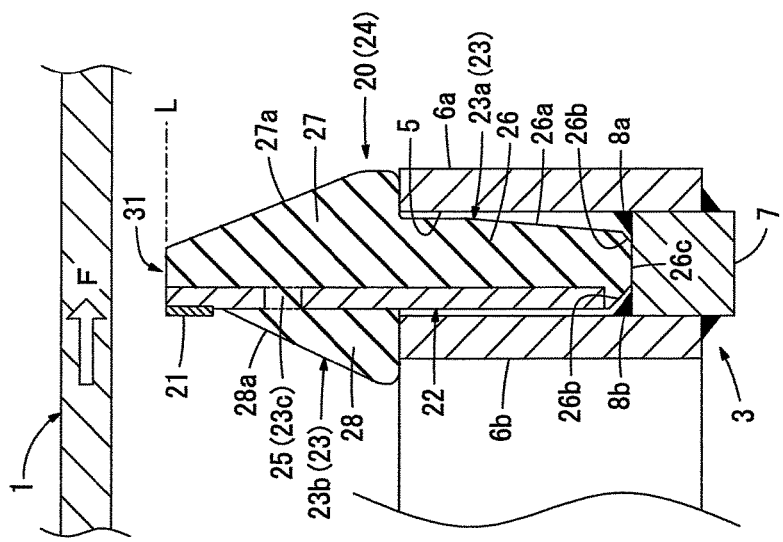
FIG. 10(A)
FIG. 10(B)

BELT CLEANER

BACKGROUND OF THE INVENTION

Field of the Invention

The present invention relates to a belt cleaner for removing the leavings of conveying material, e.g., coke, stuck on the surface of a conveyor belt at the return running side of the belt.

Description of Related Art

A prior art cleaner for a conveyor belt is disclosed in U.S. Pat. No. 3,841,470 wherein the belt cleaner includes a plurality of cleaner means disposed thereon in the transverse direction of the conveyor belt at the return running side thereof. Each cleaner means has a scraping portion thereof which intends to come into contact with the belt surface, while all the scraping portions are arranged in linear relationship. More specifically, said cleaner means, which includes a scraper having said scraping portion formed with a tip at uppermost end thereof, is yieldingly supported by a resilient member of rubber so that the scraping portion thereof becomes in contact with the belt surface under pressure by the resilience of said resilient member.

It is known that an endless conveyor belt, which is fitted for running in a circle between a drive pulley and an idler pulley, is supported at the forward running side thereof by a plurality of guide rollers arranged at "trough" angles so as to be curved in an arcuate shape in cross section in order to carry the transferring material in a stable manner. In other words, at the forward running side of the belt where the material is transferred forward, the belt is supported so that the lengthwise extending central region thereof can arcuately be deflected downward. The transferring materials are consecutively transferred generally on the central region of the belt, which will result in intensive wear on the central region of the belt surface rather than on both side regions of the same.

Because of the tendency to deflection (termed generally as a "trough" tendency), the belt is deflected arcuately upward at the return running side of the belt where the belt runs backward after discharging the transferring material therefrom. In such an arrangement of the known cleaner, the scraping portions of the cleaner means arranged in linear relationship are prevented from matching the belt surface when coming into close contact with the same. More specifically, there is a clearance between the scraping portions arranged linearly and the central region of the belt surface. The clearance becomes greater when the amount of wear on the central region of the belt surface is increased. Consequently, the leavings of material on the central region of the belt surface cannot positively be scraped off by the scraping portions of the cleaner. Since the leavings of material adhered to the belt are substantially greater in amount at the lengthwisely extending central region of the belt surface than the side regions of the same, some of the scraping portions disposed in the center get worn intensively in proportion to the amount of scraped material. This allows said clearance to become greater gradually.

Under the circumstances, an improved type of belt cleaner was developed by the present applicant under the product name "U-Type Cleaner" which is disclosed in JP-H2-50009B (EP0289659B1), JP-H5-65407B (EP0338118B1), JP-H7-20766B and JP4801753B (EP2226275B1).

FIGS. 1 to 5 show the prior art "U-Type Cleaner" developed by the present applicant. The belt cleaner includes a scraper 2 for removing the leavings stuck on a belt surface at the return running side of a conveyor belt 1, a holder 3 for holding said scraper, and pushing-up tension means (not shown).

The holder 3 is provided with a pair of rotary shafts 4 having an axis (A) extending in the transverse direction of the belt, and a pair of holding rails 6a, 6b which form a holding groove 5 curving from its both ends toward the center in the return running direction (F) of the belt. As shown in FIG. 3 and FIG. 4(A), the bottom of the holding groove 5 is formed by a bottom member 7 which is welded to the holding rails 6a, 6b in the holding groove 5. As a result, claddings 8a, 8b of weld overlays are formed on the bottom of the holding groove 5. Both ends of the inner side holding rail 6b are bent and extended to form supporting walls 9, 9. The supporting walls 9 and both ends of the bottom member 7 are connected by seat plates 10 respectively, and said rotary shafts 4 comprising pipe members are fixedly secured to the supporting walls 9 and the seat plates 10 respectively.

As shown in FIG. 2, the scraper 2 comprises a blade 14 of a resilient member 13 in which supporting plates 12 of metal such as iron are embedded in parallel with each other, and thin plate-like tips 11 of wear-resistant material such as carbide alloy are fixedly mounted on the back top of the supporting plates 12 respectively. As disclosed in the patent documents mentioned above, the blade 14 is manufactured by such a process that arranging said supporting plates 12, on which the tips 11 are mounted respectively, in parallel in a mold together with un-vulcanized rubber material, and vulcanizing said rubber material in the mold. On the opposite side of the tips 11, the vulcanized rubber material is adhered to cover the side faces of the supporting plates 12, and a leg portion 15a and a jaw portion 15b projecting from the upside of the leg portion are integrally formed. On the side beneath the tips 11, a sheet 16 made of another rubber is provided to extend downward from a fixed portion 16a secured to the supporting plates 12.

As shown in FIG. 4(A), the tip 11 has a tooth 11a projecting upward from the top end of the supporting plate 12 for purpose of effectiveness of scraping the leavings. The projecting tooth 11a, however, may be broken if it is bumped by some kind of object when carrying the scraper 2 itself or when installing the belt cleaner with the scraper 2 held in the holder 3 at the lower side of conveyor belt. In order to protect the tooth 11a, a covering filler 17 is provided in such manner that a part of rubber material of the jaw portion 15b is filled into a gap between the teeth 11a and the top end of supporting plate 12, and vulcanized together with the jaw portion 15b in the mold.

The blade 14 providing the scraper 14 can be yieldingly deformable in such manner as to be curved from the linear state as shown in FIG. 2 to the substantially arcuate shape as shown in FIG. 3. The blade 14 is curved with the tips 11 positioned inside, and inserted in the holding groove 5 by inserting the leg portion 15a and the supporting plates 12 therein, and then held in the holding groove by using bolts screwed through the holding rails 6a, 6b.

As shown in FIG. 4(A), the blade 14 covers the top end of the outer side holding rail 6a by means of said jaw portion 15b, and covers the inner side holding rail 6b by means of said sheet 16. However, an interspace (S) is made between the jaw portion 15b and the top end of the outer side holding rail 6a since the lower end of the blade is placed on the claddings 8a, 8b in the holding groove 5.

The belt cleaner is installed at the lower side of the belt 1 by mounting the rotary shafts 4 of the holder 3 on bearing means provided on frames, as not shown, where pushing-up tension means are provided on the frames. Such frames and pushing-up tension means are disclosed in the patent documents mentioned above, the description thereof is omitted here.

Said pushing-up tension means exerts resilient forces to the rotary shafts 4 in the rotating direction to lift up the center of the holder 3. As a result, the scraper 2 shifts up the posture of the tips 11 from the posture perpendicular to the belt surface to the posture inclined at an angle $\theta 1$ with respect to the belt surface as shown in FIG. 4(B), and the tips 11 are made to contact with the belt surface with pressure. Under the state that the curved portion of the scraper 2 is directed upward, a row of the tips 11 comes in contact with the belt surface with pressure across the full width thereof without causing an interspace between them so that the leavings on the belt surface may be scraped off efficiently even when the belt 1 has a trough tendency of an arcuate shape in cross section, or when the center portion of the belt surface has been worn.

According to the discovery by the present inventors, however, the prior art belt cleaner includes the following defects.

(1) Since the tips 11 are directed toward the belt surface at the angle $\theta 1$ of inclination, the covering filler 17 is pressed against the belt surface before the teeth 11a of the tips 11 come in contact with the belt surface. As a result, when the belt 1 begins running, the covering filler 17 is easily peeled-off so that the teeth 11a may expose to project from the top end of the supporting plate 12 as shown in FIG. 5(A).

(2) The exposed teeth 11a are strongly pressed diagonally against the belt surface in the direction to oppose the running direction (F) of the belt 1. Such teeth not only perform scraping the leavings but also tend to bite the belt surface to be scratched and worn faultily as shown in FIG. 5(B). Particularly, if the belt surface has a damage such as scratch, the belt 1 may be torn when the damaged portion is caught by the teeth 11a. The users are obliged to bear heavy losses by such scratching or wearing of the belt surface, moreover such tearing of the belt.

(3) On the other hand, as shown in FIG. 5(C), the exposed teeth 11a may be chipped or broken easily by bumping against a hard object on the belt surface. Such hard object may be contained in the leavings on the belt surface, or it may be a metal joint of the belt for example as shown.

(4) Further, since the fixed portion 16a of the sheet 16, which is secured on the supporting plate 12 beneath the tips 11, receives the leavings scraped off and dropped down thereon, it may be peeled off as shown in FIG. 5(B) and FIG. 5(C) and lose the function for guiding such leavings dropped away. As a result, the dropping leavings will clog up the gap between the inner side holding rail 6b and the supporting plate 12 so that it becomes difficult to pull out the scraper 2 from the holding groove 5 in the future when the scraper is to be exchanged.

(5) As mentioned above, the jaw portion 15b allows said interspace (S) (see FIG. 4(A)) without contacting with the top end face of the outside holding rail 6a. Some of the leavings passed through the tips 11 may drop on the jaw portion 15b and enter the interspace (S). It also becomes difficult to pull out the scraper 2 from the holding groove 5 in the future when the scraper is to be exchanged.

(6) The leavings are adhered unevenly on the belt surface, the tips 11 receive downward impulsion. Such impulsion may be absorbed by the backward movement of the holder 3 against the resilient force of the pushing-up tension means. However, since the supporting plates 12 receiving the impulsion at the tips 11 are not supported by the inside holding rail 6b, the plates 12 are easily rattled back and forth to cause vigorous vibrations, and the scraper 2 is expedited to be fatigued.

SUMMARY OF THE INVENTION

The present invention provides a belt cleaner which does not damage the belt surface by the tips of the scraper, and makes the scraper easy to be pulled out the holding groove of the holder in the future when it is to be exchanged.

The present invention provides a belt cleaner which removes the leavings of conveying material on the surface of a conveyor belt at the return running side thereof comprising a scraper, a holder holding said scraper and pushing-up tension means.

Said holder is provided with a pair of rotary shafts having an axis extending in the transverse direction of the belt, and a pair of holding rails which form a holding groove curving from its both ends toward the center in the return running direction of the belt.

Said scraper is comprised of a blade of a resilient member in which supporting plates are embedded in parallel with each other, and thin plate-like tips are fixedly mounted on the back top of the supporting plates respectively.

Said blade is formed to be curved from a linear state to a substantially arcuate shape and inserted to be held in the holding groove.

Said pushing-up tension means exerts resilient forces to rotate the rotary shafts so that the tips are moved up and pressed against the belt surface in an inclined posture at an angle $\theta 1$ from the perpendicular to the belt surface.

Said scraper is provided with a flat slope to be contacted with the belt surface in a manner of surface-contact connection which extends from the top edge of each tip toward the belt running direction (F) in parallel with the belt surface when the tips are held in said inclined posture.

A width (W) of said flat slope in the belt running direction with respect to the thickness (t) of said tip is formed under the condition of t<W.

Preferably, said flat slope is formed to incline downward at an angle $\theta 2$ in the belt running direction (F) about a reference line (L) perpendicular to the side face of the tip under the condition of $\theta 1=\theta 2$.

Preferably both the top edge of the tip and the top end face of the supporting plate are arranged in alignment mutually, and said flat slope is provided on the top end face of the supporting plate.

In a preferred embodiment according to the present invention, said resilient member in which the supporting plates are embedded to form the blade comprises a first resilient member and a second resilient member which are formed and secured to the front and back faces of the supporting plates respectively with respect to the belt running direction (F).

The first resilient member provides a leg portion to be inserted in the holding groove of the holder together with the supporting plates, and a first jaw portion of a block shape which comes in contact with the top end face of the outside holding rail of the holder.

The second resilient member provides a second jaw portion of a block shape which comes in contact with the top end face of the inside holding rail of the holder.

Said first and second jaw portions are formed integrally and connected by connecting portions filled in connecting apertures through the supporting plates.

Preferably, the top edge of the tip, the top end face of the supporting plate and the top end face of the first jaw portion are arranged in alignment mutually, and said flat slope is formed by both the top end face of the supporting plate and the top end face of the first jaw portion. Thereby the blade is provided with the flat slope extending along the upper edge thereof.

According to the present invention, the belt cleaner is installed at the lower side of conveyor belt, and the leavings on the belt surface are scraped off by the tips 21 of the scraper 20 which are shifted to the inclined posture at an angle 81 from the perpendicular posture via pushing-up tension means. During the scraping operation, the flat slope having the width (W) is made to contact with the belt surface with pressure in a manner of surface-contact connection.

The tips 21 which are inclined to oppose the belt running direction (F) have tendency to bite the belt surface, however, the resilient rotational force exerted to the scraper 20 by the pushing-up tension means is stationary caught by the surface-contact connection between the flat slope 29 and the belt surface. As a result, the tips 21 are prevented from biting the belt surface so as not to damage the belt surface.

Since the scraper 20 is unified integrally with the holding rails 6a, 6h of the holder 3 by means of the first jaw portion 27 and the second jaw portion 28 provided on the both front and back sides of the supporting plates 12. Upon receipt of shocks and impacts applied to the tips 21 from the belt surface, the scraper 20 and the holder 3 as unified may move back from the belt surface and absorb the shocks and impacts. As a result, a partial deflective wear of the flat slope 29, which may be caused if the blade 24 vibrates vigorously, is prevented. The surface-contact connection between the flat slope 29 and the belt surface is maintained for a long time.

BRIEF DESCRIPTION OF THE DRAWINGS

FIG. 4(A) is a cross sectional view showing the prior art belt cleaner in which the scraper is attached to the holder, and FIG. 4(B) is a cross sectional view showing the prior art cleaner installed at the lower side of conveyor belt.

FIG. 5(A) to FIG. 5(C) show operation of the prior art belt cleaner, in which FIG. 5(A) is an enlarged cross sectional view showing the teeth of tips are exposed with the covering filler peeled off, FIG. 5(B) is an enlarged cross sectional view showing the state where the teeth of tips bite the belt surface, and FIG. 5(C) is an enlarged cross sectional view showing the breakage of the teeth of tips.

FIG. 6(A) and FIG. 6(B) show a first embodiment according to the invention, in which FIG. 6(A) is a cross sectional view showing a scraper and a holder in an assembled state, and FIG. 6(B) is an enlarged cross sectional view showing a tip and a flat slope of the scraper.

FIG. 7(A) and FIG. 7(B) show the first embodiment according to the invention, in which FIG. 7(A) is a cross sectional view showing the belt cleaner installed at the lower side of conveyor belt, and FIG. 7(B) is an enlarged cross sectional view showing operation of the flat slope.

FIG. 8(A) and FIG. 8(B) show a second embodiment according to the invention, in which FIG. 8(A) is a cross sectional view showing a scraper and a holder in an assembled state, and FIG. 8(B) is an enlarged cross sectional view showing a tip and a flat slope of the scraper.

FIG. 9(A) and FIG. 9(B) show the second embodiment according to the invention, in which FIG. 9(A) is a cross sectional view showing the belt cleaner installed at the lower side of conveyor belt, and FIG. 9(B) is an enlarged cross sectional view showing operation of the flat slope.

FIG. 10(A) and FIG. 10(B) show a third embodiment according to the invention, in which FIG. 10(A) is a cross sectional view showing a scraper and a holder in an assembled state, and FIG. 10(B) is an enlarged cross sectional view showing a tip and a flat slope of the scraper.

FIGS. 11(A)-11(C) show the third embodiment according to the invention, in which FIG. 11(A) is a cross sectional view showing the belt cleaner installed at the lower side of conveyor belt, and FIG. 11(B) is an enlarged cross sectional view showing operation of the flat slope, with FIG. 11(C) showing the worn condition.

DETAILED DESCRIPTION OF THE INVENTION

Figure 1:
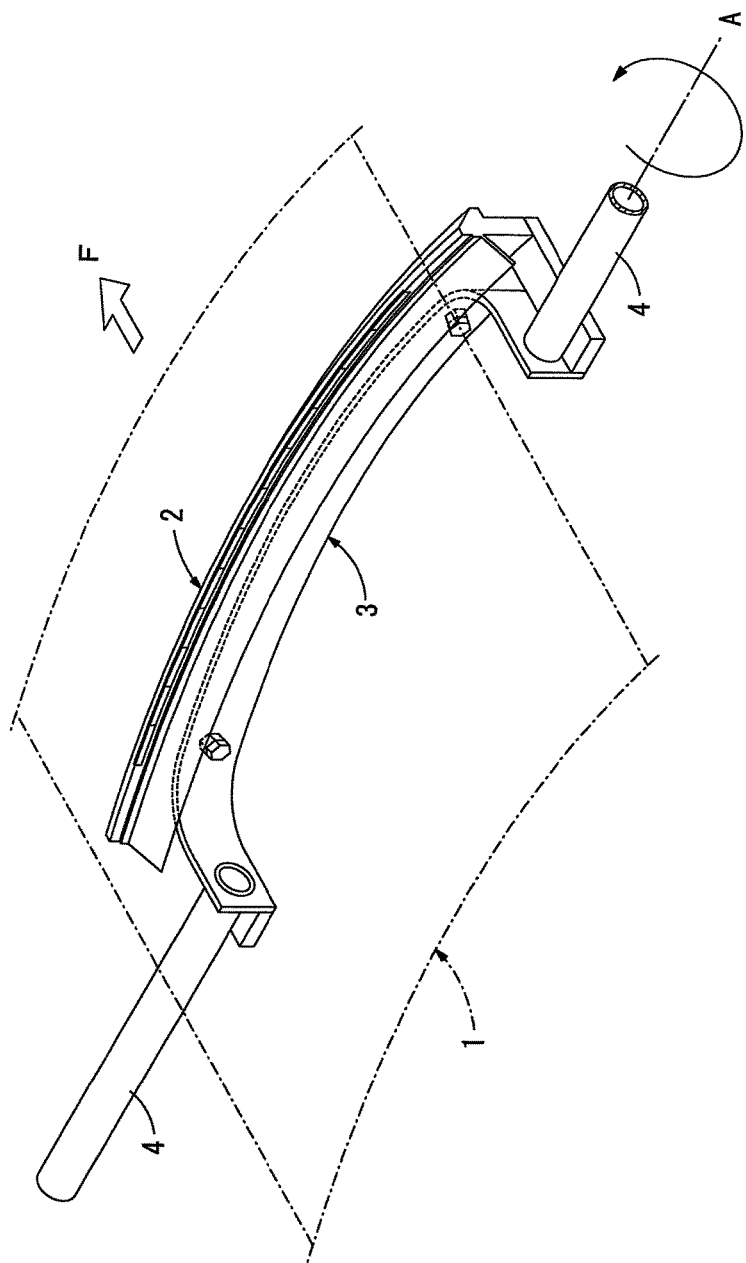
FIG. 1 is a perspective view showing a prior art belt cleaner.
Figure 2:
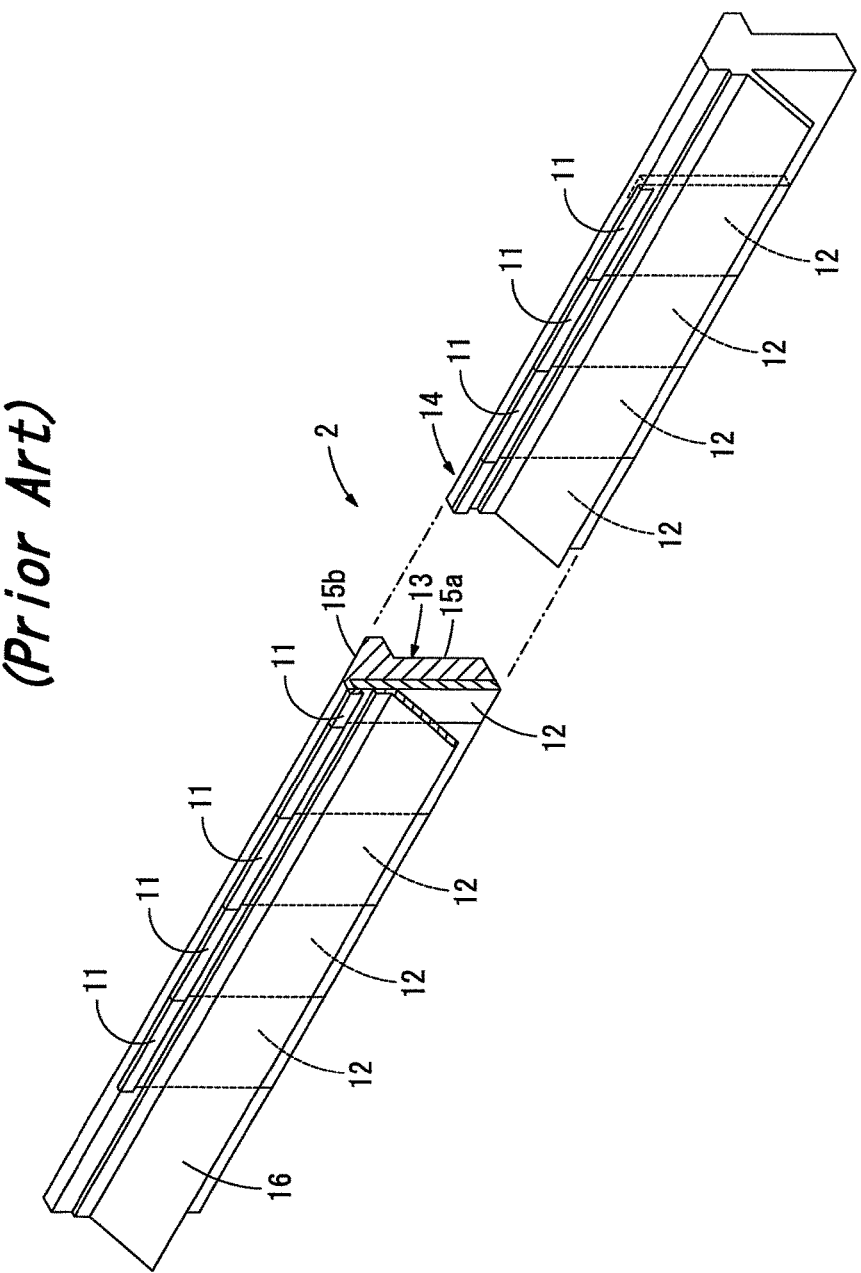
FIG. 2 is a perspective view showing a scraper of the prior art belt cleaner.
Figure 3:
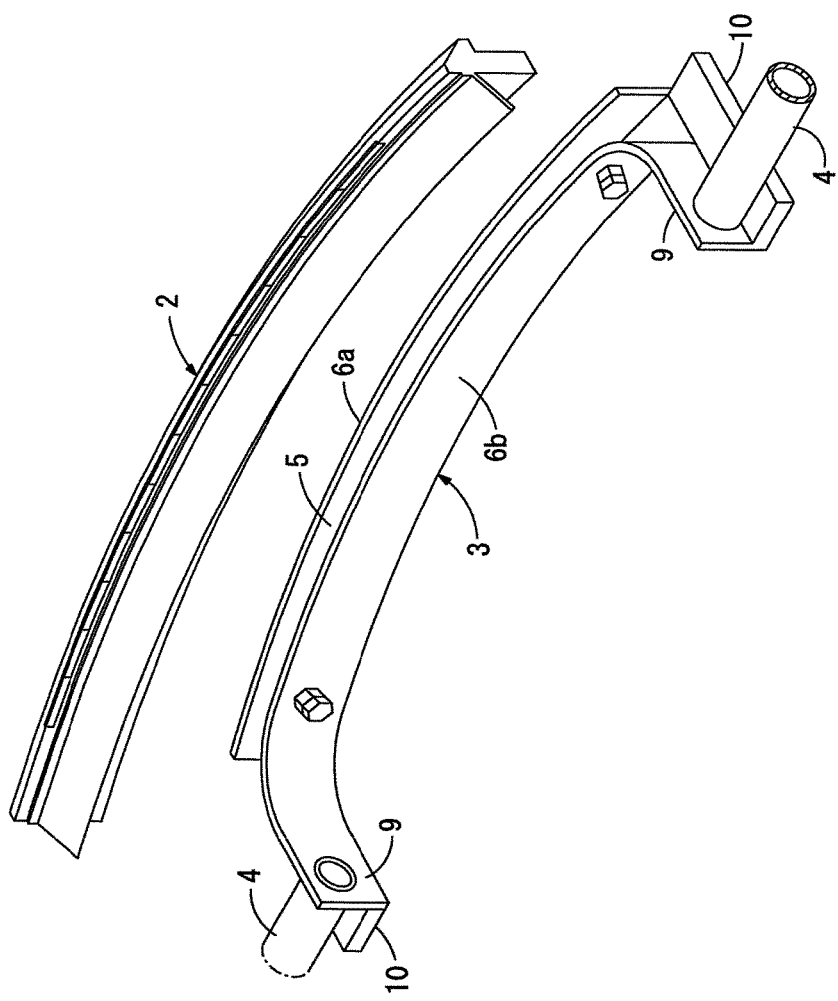
FIG. 3 is a perspective view showing the scraper and the holder of the prior art belt cleaner in a disassembled state.
Figure 5A:
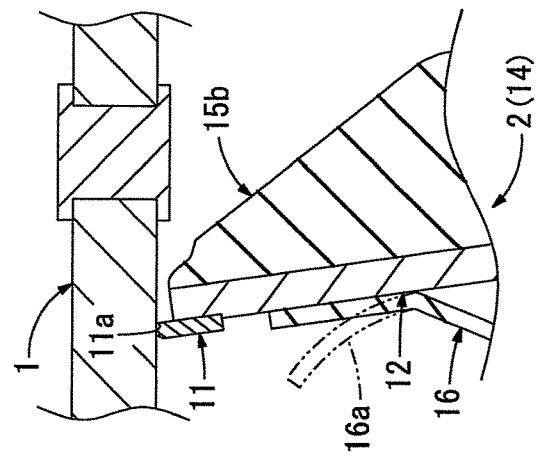
Figure 5B:
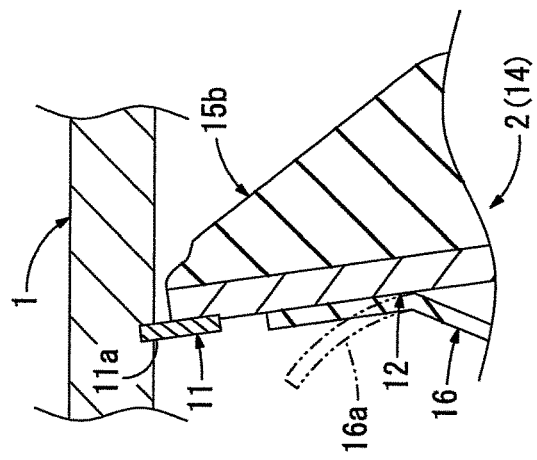
Figure 5C:
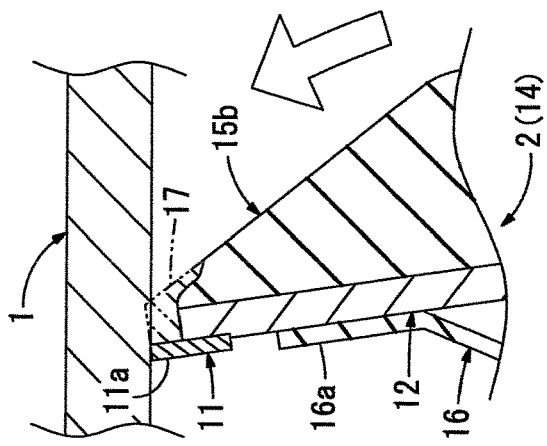

Preferred embodiments of the present invention will be described in detail in conjunction with the accompanying drawings.

In the embodiments described hereinafter, a belt cleaner according to the present invention includes a scraper 20 for removing the leavings stuck on a belt surface at the return running side of a conveyor belt 1, a holder 3 supporting said scraper, and pushing-up tension means (not shown).

Said holder 3, which has substantially the same structure as the holder of prior art belt cleaner mentioned above according to FIG. 1 to FIG. 5, is provided with a pair of rotary shafts 4 having an axis (A) extending in the transverse direction of the belt, and a pair of holding rails 6a, 6b which form a holding groove 5 curving from its both ends toward the center in the return running direction (F) of the belt. As mentioned above, the bottom of the holding groove 5 is formed by a bottom member 7 which is welded to the holding rails 6a, 6b in the holding groove 5. As a result, claddings 8a, 8b of weld overlays are formed on the bottom of the holding groove 5. Both ends of the inner side holding rail 6b are bent and extended to form supporting walls 9, 9. The supporting walls 9 and both ends of the bottom member 7 are connected by seat plates 10 respectively so that said rotary shafts 4 comprising pipe members are fixedly secured to the supporting walls 9 and the seat plates 10 respectively.

Said scraper 20 comprises a blade 24 of a resilient member 23 in which supporting plates 22 of metal such as iron are embedded in parallel with each other, and thin plate-like tips 21 of wear-resistant material such as carbide alloy or ceramic are fixedly mounted on the back top faces of the supporting plates 22 respectively. The blade 24 can be yieldingly deformable in such manner as to be curved from the linear state to the substantially arcuate shape. The blade 24 is curved with the tips 21 positioned inside, and inserted in the holding groove 5 of the holder 3 and held therein by using bolts screwed through the holding rails 6a, 6b.

The belt cleaner is installed at the lower side of the belt 1 by mounting the rotary shafts 4 of the holder 3 on bearing means provided on frames. The rotary shafts 4 are rotated by resilient forces of pushing-up means, of which illustration is omitted, to lift up the center of the holder 3. As a result, the scraper 20 shifts up the posture of the tips 11 from a vertical posture to an inclined posture at an angle θ1 with respect to the belt surface so as to be brought into contact with the belt surface with pressure. The scraper 20 directs the curved portion upward and makes a row of the tips 21 contact with the belt surface with pressure over whole width thereof without causing an interspace therebetween so that the leavings on the belt surface may be scraped off efficiently even when the belt 1 has a trough tendency of an arcuate shape in cross section, or when the center portion of the belt surface has been worn.

The foregoing features and operations are substantially same to those of the prior art, and embodiments of the present invention are described as follows.

A First Embodiment

FIG. 6 and FIG. 7 show a first embodiment of the belt cleaner according to the present invention.

With respect to the belt running direction (F) as shown in FIG. 6(A), the front side (the right side in the figure) of the supporting plate 22 is referred to as "the front face", and the back side (the left side in the figure) of the supporting plate 22 is referred to as "the back face" hereinafter. The tip 21 is secured to the upper end of the back face of each supporting plate 22 by means of brazing or the like so as to both the top edge of the tip 21 and the top end face of the supporting plate 22 are aligned to form a flush surface. In other words, there is no tooth 11a as described about the prior art Said resilient member 23 of the blade 24, in which the supporting plates 22 are embedded, comprises a first resilient member 23a formed on the front faces of the supporting plates 22, and a second resilient member 23b formed on the back faces of the supporting plates 22. In the process of manufacturing the blade 24, the supporting plates 22 with the tips 21 secured are inserted in parallel in a mold, a first rubber material and a second rubber material are arranged on the front and back faces of the supporting plates 22 in the mold, and these rubber materials are vulcanized to form the first resilient member 23a and the second resilient member 23b respectively. Since a connecting aperture 25 is formed through the portion beneath the tip 21 in each or some of the supporting plates 22, said rubber materials are filled in the aperture 25 and vulcanized to form a connecting portion 23c which connects the first resilient member 23a and the second resilient member 23b integrally with each other.

The first resilient member 23a is provided with a thick leg portion 26 and a first jaw portion 27 of a block shape projecting from the upside thereof. The leg portion 26 covers over the front faces as well as the lower ends of the supporting plates 22 and is inserted in the holding groove 5 of the holder 3, and the first jaw portion 27 covers the top end of the outside holding rail 6a of the holder 3.

The leg portion 26 has a tapered surface 26a which makes the thickness thereof reduce downward, and cutouts 26b, 26b are provided by chamfering or rounding the lower end corners of the leg portion so as not to be placed on the claddings 8a, 8b. As a result, the leg portion 26 is inserted in the holding groove 5 in such manner that the bottom surface 26c comes in contact with the bottom member 7 and the first jaw portion 27 fits on the top end face of the holding rail 6a without causing any interspace. As shown, a tapered surface 27a may be formed preferably on the first jaw portion 27 by reducing the thickness thereof upward.

The second resilient member 23b provides a second jaw portion 28 of a block shape on the back faces of the supporting plates 22 beneath the tips 21. The second jaw portion 28 is connected integrally to the first jaw portion 27 by the connecting portion 23c, and covers and fits on the top end face of the inside holding rail 6b of the holder 3. A tapered surface 28a may be formed preferably on the second jaw portion 28 by reducing the thickness thereof upward.

The blade 24 is provided with a flat slope 29. When the tips 21 are held in the inclined posture at an angle θ1 as mentioned above, the flat slope 29 extends from the top edges of the tips 21 toward the belt running direction (F) in parallel with the belt surface, and contacts with the belt surface in a surface-contact connection manner. In other words, as shown in FIG. 6(A), the flat slope 29 is inclined downward at an angle θ2 toward the belt running direction (F) with respect to a reference line (L) perpendicular to the side face of the tip 21, and preferably the condition is made to be θ1=θ2.

In the first embodiment as shown in FIG. 6(B), the flat slope 29 is formed by both the top end faces 22a of the supporting plates 22 and the top end face 27b of the first jaw portion 27 so that the flat slope extends along the upper edge of the blade 24. A width (W) of said flat slope 29 in the belt running direction (F) with respect to the thickness (t) of the tip 21 is formed under the condition of t<W.

(Operation)

Figure 7A:
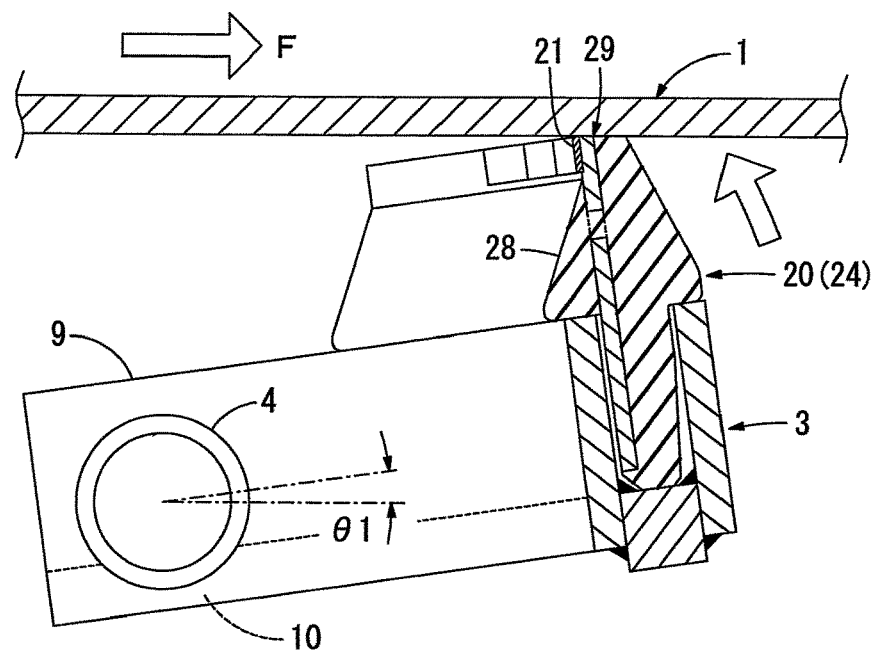

As shown in FIG. 7(A), the belt cleaner installed at the lower side of the belt 1 lifts up the center of the scraper 20 together with the holder 3 by rotating the rotary shafts 4 of the holder 3 via resilient forces, and the tips 11 are tilted to shift up the posture from the vertical posture to the inclined posture at an angle θ1 with respect to the belt surface so that the tips 11 come in contact with the belt surface with pressure and scrape the leavings on the belt surface during the running operation of the belt. The dropping objects caused from the leavings scraped off fall down while guided by the tapered surface 28a of the second jaw portion 28 so as to be prevented from entering in the holding groove 5 through the top end of the inside holding rail 6b. Some small amount of the leavings passed through the tips 21 without being scraped thereby may be peeled off at the end of the flat slope 29 and dropped, however, such dropping objects are fell down while guided by the tapered surface 27a of the first jaw portion 27 so as to be prevented from entering in the holding groove 5 through the top end of the outside holding rail 6a. As a result, a difficulty of pulling out the scraper 20 from the holding groove 5 in the future exchange thereof is avoided.

The second jaw portion 28 which receives a large quantity of dropping objects is formed in a block shape and connected to the first jaw portion 27 by the connecting portion 23c. As a result, the function of the second jaw portion may be maintained for a long term without being easily peeled or fatigued as seen in the sheet 16 of the prior art.

Since the holding groove 5 is protected against invasion of the dropping objects as mentioned above, the leg portion 26 can be provided with the tapered surface 26a which makes the blade 24 easy to be inserted in or pulled out the holding groove 5.

Figure 7B:
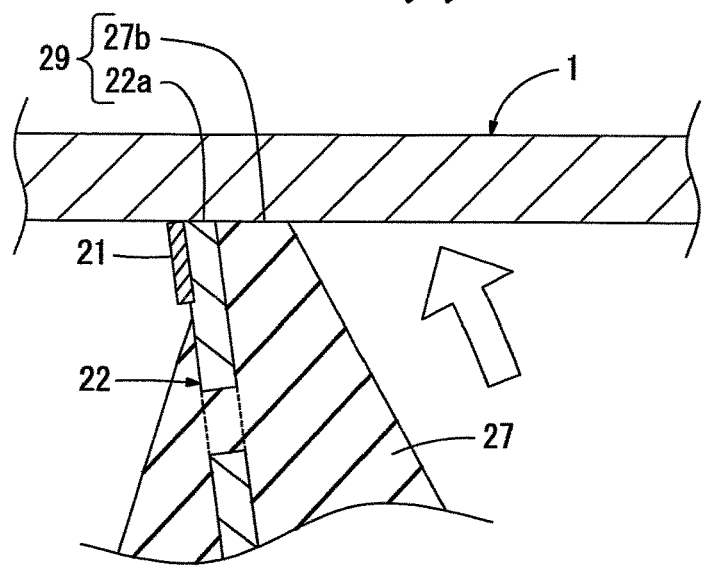

When the tips 21 are brought in contact with the belt surface with pressure by shifting up the posture from a vertical posture to an inclined posture at an angle θ1 as mentioned above, a whole surface of the flat slope 29 together with the tips 21 comes in contact with the belt surface as shown in FIG. 7(B). The tips 21 which are inclined to oppose the belt running direction (F) have tendency to bite the belt surface, however, the resilient rotational force exerted to the scraper 20 by the pushing-up tension means is stationary caught by the surface-contact connection between the flat slope 29 and the belt surface.

Accordingly, the tips 21 are prevented from biting the belt surface so that no damage of the belt surface may be caused.

The leavings are adhered unevenly on the belt surface, the tips 11 receive downward impulsion. Such impulsion may be absorbed by the backward movement of the holder 3 against the resilient force of the pushing-up tension means. In this connection, the supporting plates 22 receiving the impulsion at the tips 11 are supported by the second jaw portion 28 on the inside holding rail 6b. As a result, the plates 12 are prevented from being rattled back and forth, and the prevention of causing vigorous vibrations is achieved.

The scraper 20 is unified integrally with the holding rails 6a, 6b of the holder 3 by means of the first jaw portion 27 and the second jaw portion 28 provided on the both sides of the supporting plates 12. The scraper 20 moves back from the belt surface in a unified manner with the holder 3 to absorb said impulsion. It makes possible to maintain for a long time the surface-contact connection of the flat slope 29 to the belt surface without causing a partial deflective wear thereof. Then, such object of the invention as not to form an exposed projecting tooth of the tip 21 against the belt surface may be achieved.

A Second Embodiment

Figure 9A:
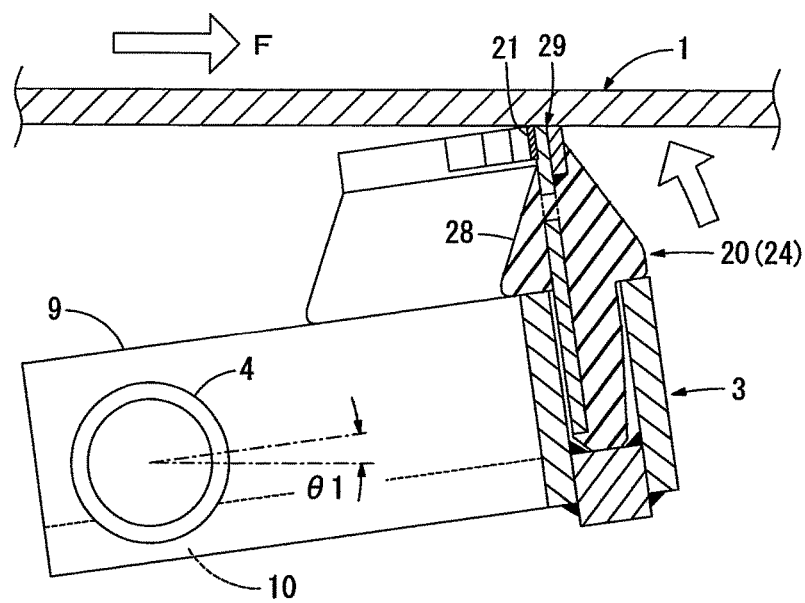
Figure 9B:
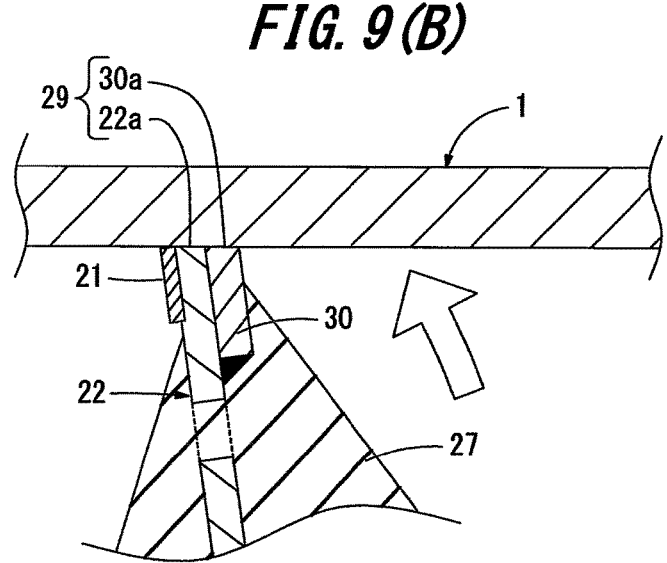

FIG. 8 and FIG. 9 show a second embodiment of the belt cleaner according to the present invention.

In the second embodiment, a plate member 30 is fixedly secured to the front face at the upper end of each supporting plate 22. In the illustrated embodiment, the plate member 30 is made of metal such as iron, and the lower end is secured by welding to the supporting plate 22. The plate member 30, however, may be made of material other than metal, such as ceramic.

The flat slope 29 is provided to extend from the top edge of the tip 21 toward the belt running direction (F) to contact with the belt surface in a surface-contact connection manner. As shown in FIG. 8(A), the flat slope 29 is inclined downward at an angle θ2 toward the belt running direction (F) with respect to a reference line (L) perpendicular to the side face of the tip 21. The condition of the angle, θ2 is made to be θ1=θ2 in a similar way mentioned about the first embodiment.

As shown in FIG. 8(B) with respect to the second embodiment, the flat slope 29 is comprised of the top end faces 22a of the supporting plates 22 and the top end faces 30a of the plate members 30 so that the flat slope 29 extends along the upper edge of the blade 24. A width (W) of said flat slope 29 in the belt running direction (F) with respect to the thickness (t) of the tip 21 is formed under the condition of t<W.

FIG. 9 shows an operation of the belt cleaner of the second embodiment. Since the operation is almost same to that of the first embodiment mentioned above with reference to FIG. 7, the description thereof is omitted here.

A Third Embodiment

Figure 11:
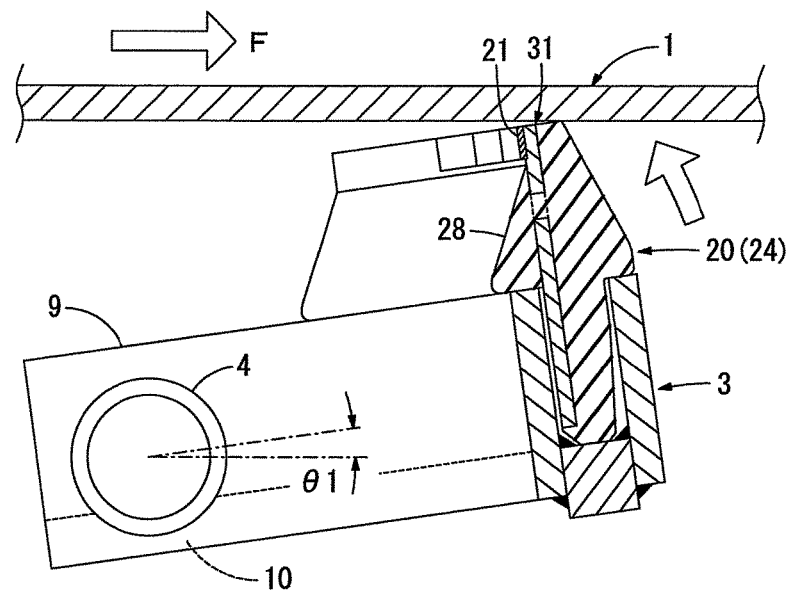
Figure 11:
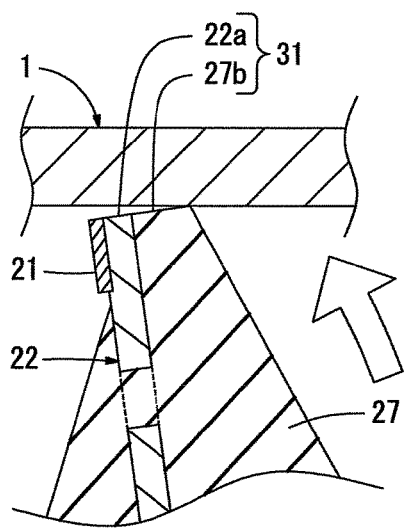
Figure 11:
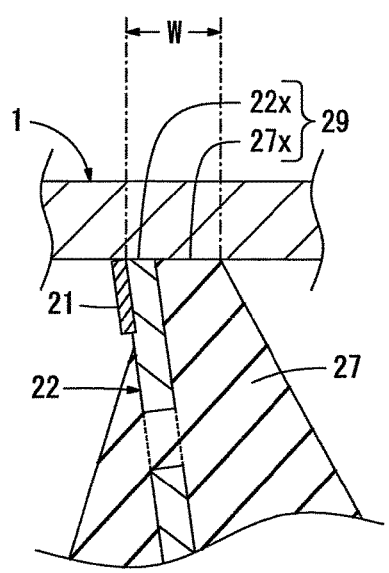

FIG. 10 and FIG. 11 show a third embodiment of the belt cleaner according to the present invention.

In the third embodiment, although the general construction of the scraper is almost same to that of the first embodiment mentioned above, the scraper 29 is provided with no flat slope 29 before it is use.

As shown in FIG. 10, the blade 24, which has not yet been used, provides a flat surface 31 extending from the top edge of the tip 21 toward the belt running direction (F). The flat surface 31 is formed on the reference line (L) perpendicular to the side face of the tip 21 as shown in FIG. 10(A). In the illustrated embodiment, the flat surface 31 is comprised of the top end faces 22a of the supporting plates 22 and the top end face 27b of the first jaw portion 27 so that the flat slope 29 extends along the upper edge of the blade 24. A width (W) of the flat surface (W) with respect to the thickness (t) of the tip 21 is formed under the condition of t<W as shown in FIG. 10(B).

In the third embodiment, as shown in FIG. 11(A), the belt cleaner installed at the lower side of the belt 1 lifts up the center of the scraper 20 together with the holder 3 by rotating the rotary shafts 4 of the holder 3 via resilient forces, and the tips 11 are tilted to shift up the posture from the vertical posture to the inclined posture at an angle θ1 with respect to the belt surface. In this state, the flat surface 31 is placed above the top edges of the tips 11, and the flat surface 31 comes in contact with the belt surface with pressure as shown in FIG. 11(B).

When the belt 1 begins running, said flat surface 31 is worn gradually by the friction with the belt surface. After the predetermined time has passed, the flat surface 31 comprising the top end faces 22a, 27b is worn to become inclined surfaces 22x, 27x respectively so that a flat slope 29 having a width (W) and extending from the top edge of the tip 21 in the belt running direction (F) in parallel with the belt surface may be formed as shown in FIG. 11(C).

As a result, a whole surface of the flat slope 29 together with the tips 21 comes in contact with the belt surface. The tips 21 which are inclined to oppose the belt running direction (F) have tendency to bite the belt surface, however, the resilient rotational force exerted to the scraper 20 by the pushing-up tension means is stationary caught by the surface-contact connection between the flat slope 29 and the belt surface. Accordingly, the tips 21 are prevented from biting the belt surface so as not to damage the belt.

REFERENCES 1 conveyor belt
2 scraper (prior art)
3 holder
4 rotary shaft
5 holding groove
6a, 6b holding rail
7 bottom member
8a, 8b cladding of weld overlay
9 supporting wall
10 seat plate
11 tip (prior art)
11a teeth (prior art)
12 supporting plate (prior art)
13 resilient member (prior art)
14 blade (prior art)
15a leg portion (prior art)
15b jaw portion (prior art)
16 sheet (prior art)
16a fixed portion (prior art)
17 covering filler (prior art)
20 scraper
21 tip
22 supporting plate
22a top end face
23 resilient member
23a first resilient member
23b second resilient member
23c connecting portion 24 blade
25 connecting aperture
26 leg portion
26a tapered surface
26b cutout
26c bottom surface
27 first jaw portion
27a tapered surface
27b top end face
28 second jaw portion
28a tapered surface
29 flat slope
30 plate member
30a top end face
31 flat surface

What is claimed is:

1. A belt cleaner which removes leavings of conveying material on a surface of a conveyor belt at the return running side thereof comprising a scraper (20), a holder (3) holding said scraper and pushing-up tension means;
wherein said holder (3) is provided with a pair of rotary shafts (4) having an axis extending in the transverse direction of the belt, and a pair of holding rails (6a,6b) which form a holding groove (5) curving from its both ends toward the center in the return running direction (F) of the belt, and
wherein said scraper (20) is comprised of a blade (24) of a resilient member (23) in which supporting plates (22) are embedded in parallel with each other, and thin plate-like tips (21) are fixedly mounted on the back top of said supporting plates (22) respectively, said blade (24) being formed to be curved from a linear state to a substantially arcuate shape and inserted to be held in said holding groove (5), and said pushing-up tension means exerting resilient forces to rotate said rotary shafts (4) so that said tips (21) are moved up and pressed against the belt surface in an inclined posture at an angle θ1 from the perpendicular to the belt surface, wherein:
said scraper (20) is provided with a flat slope (29) to be contacted with the belt surface in a manner of surface-contact connection which extends from the top edge of each tip (21) toward the belt running direction (F) in parallel with the belt surface when said tips are held in said inclined posture, and
a width (W) of said flat slope (29) in the belt running direction (F) with respect to the thickness (t) of said tip (21) is formed under the condition of t<W.

2. A belt cleaner according to claim 1 wherein said flat slope (29) is formed to incline downward at an angle θ2 in the belt running direction (F) about a reference line (L) perpendicular to the side face of the tip (21) under the condition of θ1=θ2.

3. A belt cleaner according to claim 1, wherein both the top edge of the tip (21) and the top end face (22a) of the supporting plate are arranged in alignment mutually, and said flat slope (29) is formed with said top end faces (22a) of said supporting plates.

4. A belt cleaner according to claim 1, wherein said resilient member (23) in which the supporting plates (22) are embedded to form the blade comprises a first resilient member (23a) and a second resilient member (23b) which are formed and secured to the front and back faces of the supporting plates (22) respectively with respect to the belt running direction (F),
wherein said first resilient member (23a) is provided with a leg portion (26) to be inserted in said holding groove of the holder together with said supporting plates, and a first jaw portion (27) of a block shape which comes in contact with the top end face of the outside holding rail (6a) of the holder,
said second resilient member (23b) is provided with a second jaw portion (28) of a block shape which comes in contact with the top end face of the inside holding rail (6b) of the holder, and
said first and second jaw portions (27, 28) are formed integrally and connected by connecting portions (23c) filled in connecting an aperture (25) through said supporting plate.

5. A belt cleaner according to claim 4, wherein the top edge of the tip (21), the top end face of the supporting plate (22) and the top end face of the first jaw portion (27) are arranged in alignment mutually, and said flat slope (29) is formed by both said top end face (22a) of the supporting plate and said top end face (27b) of the first jaw portion.

* * * * *